Patented Feb. 7, 1939

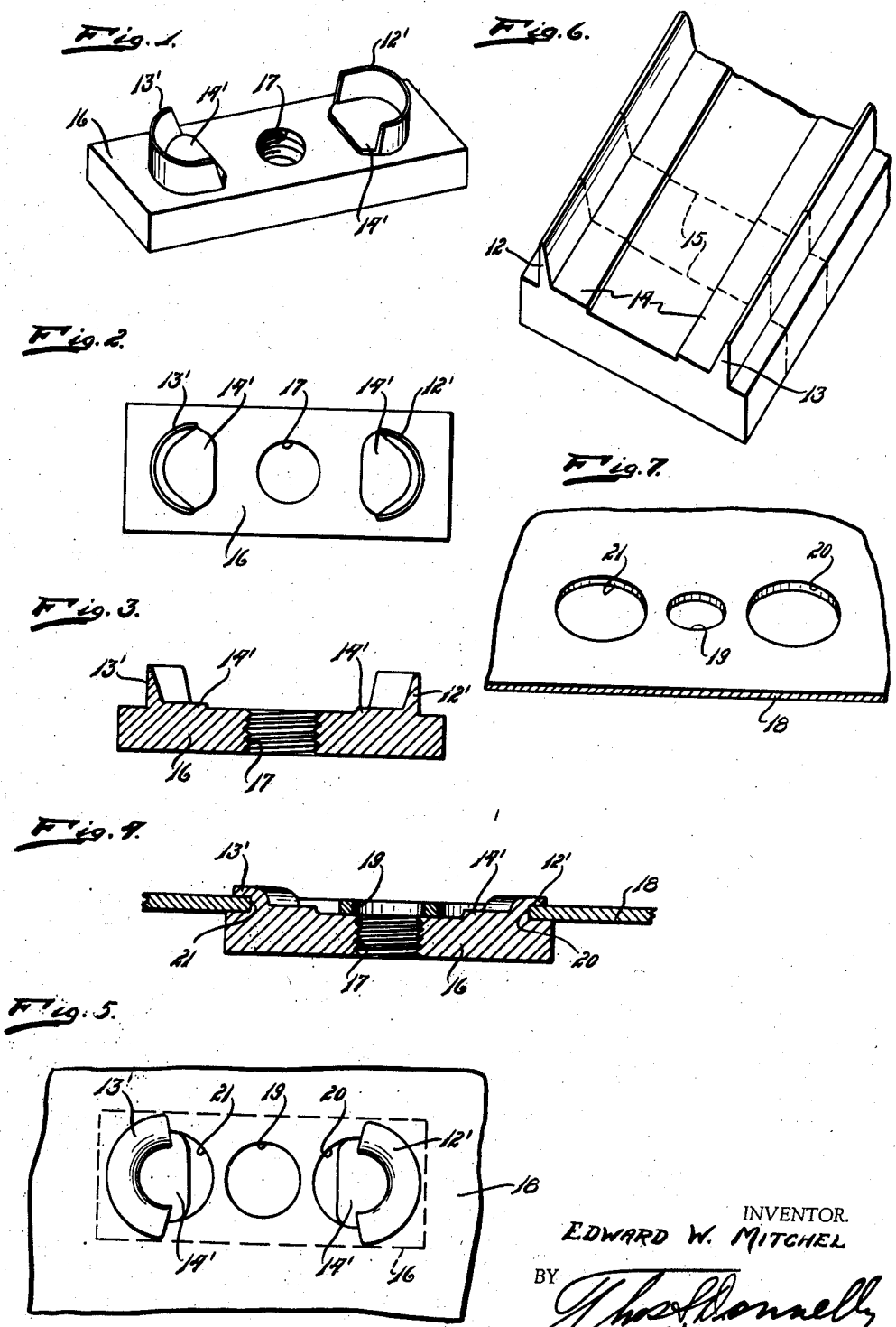

2,145,944

UNITED STATES PATENT OFFICE 2,145,944

FENDER LUG

Edward W. Mitchel, Detroit, Mich.

Application October 20, 1937, Serial No. 170,072

3 Claims. (Cl. 85—32)

My invention relates to a new and useful improvement in a fender lug adapted for mounting on a vehicle body in such a position that a nut will be fixedly mounted at the proper location for cooperating with a bolt used to secure a fender on a vehicle body.

It is an object of the present invention to provide a fender lug of this type which will be simple in structure, economical of manufacture, durable, easily and quickly installed and highly efficient in use.

Another object of the invention is the provision of a fender lug whereby leakage of dust, mud or water around the lug fastenings or around the bolt will be prevented.

Another object of the invention is the provision of a fender lug comprising an elongated body having an opening formed therethrough at substantially the medial line thereof and provided with securing projections at opposite sides of the opening.

Another object of the invention is the provision of a fender lug having at opposite sides of a central opening, projections extending outwardly and formed into arcuate shape from parallel positions.

Other objects will appear hereinafter.

The invention consists in the combination and arrangement of parts hereinafter described and claimed.

The invention will be best understood by a reference to the accompanying drawing which forms a part of this specification, and in which, Fig 1 is a perspective view of the invention.

Fig. 2 is a top plan view of the invention.

Fig. 3 is a longitudinal, vertical, central, sectional view of the invention.

Fig. 4 is a view similar to Fig. 3 showing the invention applied in position.

Fig. 5 is a top plan view of the invention showing it applied.

Fig. 6 is a perspective view of a blank from which the invention is formed.

Fig. 7 is a fragmentary, perspective view of a panel in which the invention is used.

As shown in Fig. 6, the invention is cut from a strip of elongated metal having at opposite sides the parallel extending ribs 12 and 13 terminating at their inner lower ends with the raised portion 14 on the body. This strip is cut on the dotted lines 15 to the proper width and the strip 16 cut therefrom may be termed the lug body. Formed centrally through this body at substantially the transverse medial line is an opening 17 which is threaded for the reception of a bolt. By a forming operation, the parallel extending ribs 12 and 13 are pressed into semi-circular form to provide the securing projections 12' and 13', the raised portion 14' permitting the necessary flowing of the metal from which the ribs 12 and 13 are formed to prevent shearing.

With this type of construction the strip of metal from which the blanks are struck need not be formed by a cold rolling or a cold drawing process as the strip may be satisfactorily produced in a hot rolling operation. The accuracy obtained in a cold drawing process is not required in the strip from which the blanks are struck because such inaccuracies as may result from a hot rolling operation are compensated for by the forming operation whereby the parallel extending ribs 12 and 13 are formed into the arcuate projections 12' and 13'. The formation dies which serve to press the straight ribs into arcuate formation accurately press these parts into the predetermined spacings and shape maintaining very close limits. Thus, such inaccuracies as may result from the hot rolling operation and such variations in spacing and location or thickness which may be present in the parallel extending ribs prior to their arcuate formation are all eliminated and the formation operation serves to convert these parallel ribs into the arcuate projections.

It will be noted that the arcs into which the members 12' and 13' are formed are struck on a circle, the center of which is outside of the center of the opening 17 and on circles which are not common as to their center. The members 12' and 13' are indicated as being equally spaced on opposite sides of the opening 17 so that if they were struck on a common center, this center would be the center of the opening 17. This equal spacing may not be retained in all cases, but for a practical construction, the arcs 12' and 13' would not be struck from a common center.

The panel with which these lugs are used consists of the body 18 having an opening 19 through which a bolt is projected. At opposite sides of the opening 19 are formed the openings 20 and 21. Through these openings 20 and 21 the projections 12' and 13' are extended.

It will be noted, that the body 16 projects on all sides beyond the arcuate projections 12' and 13' so that when the projections 12' and 13' are extended through the openings 20 and 21, there is a part of the body 16 which will extend beyond these openings in all directions so that the face of the body 16 may be brought into engagement with the face of the body 18. After the extending of the projections 12' and 13' through the openings 20 and 21, these projections are doubled over and upset or clinched as shown in Fig. 4 and Fig. 5. When upset, as illustrated, the doubled-over or clinched portion will not break or crack. As previously mentioned, the shearing of the projections 12' and 13' at the lower edge of their outer surface from the body 16 is prevented by the presence of the elevated body 14 which provides the necessary flowing in the formation operation. By forming the parallel ribs 12 and 13 into the arcuate formation to provide the projections 12' and 13' a structure is present in which the grain of the metal is reenforced and strengthened so that the cracking or splitting of the projections when clinched is prevented. Thus, a durable, strong structure is provided which will not loosen or weaken after having been upset so that a rigid, permanent structure is obtained.

The projections when extended through the openings 20 and 21, serve to center the opening 17 with the opening 19 and a clinching of these projections over the panel body 18 serves to press the face of the body 16 tightly against the face of the panel 18 in sealing relation so that leakage between the panel 18 and the body 16 is prevented. Thus, the passage of dirt, water and the other foreign material through the openings 20 and 21 is prevented. Similarly, the body 18 around the opening 19 is sealed against the face of the body 16. With this construction the use of a gasket between the bodies 16 and 18 is avoided.

It will be noted that the holes 19, 20 and 21 which are formed in the plate 18, are illustrated as being circular and the projections 12' and 13' do not serve as closures for these openings. This is not necessary as the plate 16 serves as a sealing member. Were prongs used which extend from the ends of the body, it would be necessary that the openings in the plate 18 be formed by a punching operation. With the type of structure illustrated and the formation of openings circular as described, these openings may be formed in the plate 18 by a drilling operation which would be much more economical in manufacture than a punching process, as all of the sets of holes to be formed in the plate 18 might be formed at the same time by the use of a gang drill.

It is obvious that the body 16 serves as a nut for the bolt which is threaded into the opening 17 so that there is thus provided an elongated nut having the fastening projections 12' and 13' positioned between the opening 17 and the opposite ends of the body 16. It is also believed obvious that if desired the members 12' and 13' may be defined bow-shaped instead of arcuate and in the claims attached hereto the term arcuate shall be concluded to be the equivalent of the term bow-shaped or V-shaped whenever the structure defined will permit of such an interpretation.

In this way I have provided a fender lug which may be economically manufactured and which will serve to seal tightly against the body with which used while at the same time the securing means, in the nature of the projections 12' and 13', are carried as a part of the body 16 through which the threaded opening 17 is formed.

While I have illustrated and described the preferred form of construction I do not wish to limit myself to the precise details of structure shown but desire to avail myself of such variations and modifications as may come within the scope of the appended clams.

What I claim as new is:

1. A nut of the class described, comprising: an elongated body having a threaded opening formed therethrough substantially centrally thereof; a pair of spaced arcuate projecting members positioned at opposite sides of said opening and spaced inwardly from the edges of said body to provide a portion of said body projecting outwardly from the location of said projections, said projections being arcuate and struck on a center positioned outside the center of said opening.

2. A nut of the class described, comprising: a comparatively elongated body having a threaded opening formed therethrough substantially centrally thereof; a pair of arcuate securing members projecting outwardly from one face of said body at opposite sides of said opening, said securing members being faced toward each other and struck on a circle having a center outside the center of said opening and formed from parallel extending ribs projecting transversely of said body.

3. In combination a supporting body having a central opening positioned between a pair of side openings; an elongated nut-forming body having a threaded opening formed therethrough substantially centrally thereof; low-shaped securing members projecting outwardly from one face of said nut forming body on opposite sides of said threaded opening and faced toward each other, said securing members being projectible through said side epenings and adapted for clinching over one face of said supporting body for binding the opposite face of said supporting body against one face of said nut-forming body in sealing relation, said nut-forming body projecting beyond the area of said openings, the threaded opening in said nut-forming body registering with the central opening in said supporting body.

EDWARD W. MITCHEL.